(12) United States Patent
Rösing et al.

(10) Patent No.: US 11,408,454 B2
(45) Date of Patent: Aug. 9, 2022

(54) FASTENER FOR ATTACHING TOGETHER WORKPIECES HAVING ALIGNED HOLES THERETHROUGH

(71) Applicant: Fairchild Fasteners Europe—VSD GmbH, Hildesheim (DE)

(72) Inventors: Jürgen Rösing, Sehnde (DE); Meindert Büsse, Bad Salzdetfurth (DE); Jan Dohmeyer, Gehrden (DE); Sead Dzebo, Hildesheim (DE); Torsten Timpe, Hildesheim (DE)

(73) Assignee: Fairchild Fasteners Europe—VSD GmbH, Hildesheim (DE)

( * ) Notice: Subject to any disclaimer, the term of this patent is extended or adjusted under 35 U.S.C. 154(b) by 81 days.

(21) Appl. No.: 16/609,908

(22) PCT Filed: May 4, 2018

(86) PCT No.: PCT/EP2018/061590
§ 371 (c)(1),
(2) Date: Oct. 31, 2019

(87) PCT Pub. No.: WO2018/202887
PCT Pub. Date: Nov. 8, 2018

(65) Prior Publication Data
US 2020/0116179 A1      Apr. 16, 2020

(30) Foreign Application Priority Data

May 4, 2017  (EP) .................................... 17169432

(51) Int. Cl.
*F16B 33/06*     (2006.01)
*F16B 5/02*      (2006.01)

(52) U.S. Cl.
CPC ............. *F16B 5/025* (2013.01); *F16B 33/06* (2013.01)

(58) Field of Classification Search
CPC ................................. F16B 5/025; F16B 33/06
See application file for complete search history.

(56) References Cited

U.S. PATENT DOCUMENTS 2,518,468 A * 8/1950 Harding ............... F16B 39/36
                                                 411/269
2,934,480 A * 4/1960 Slomin ................ C25D 11/26
                                                 205/152

(Continued)

FOREIGN PATENT DOCUMENTS

GB          1441279 A      6/1976

OTHER PUBLICATIONS

International Search Report and Written Opinion of the International Searching Authority dated Jul. 10, 2018 for PCT/EP2018/061590 filed May 4, 2018, 15 pgs.

*Primary Examiner* — Rick K Chang
(74) *Attorney, Agent, or Firm* — Boardman & Clark LLP

(57) ABSTRACT

The invention relates to a fastener (10) for attaching together workpieces (50a, 50b) having aligned holes therethrough, the fastener (10) comprising a shank portion (11) and a head portion (13) provided at one end of the shank portion (11), the diameter of the shank portion (11) and/or of the head portion (13) being selected such that the fastener (10) can be installed in the aligned holes in close tolerance. The fastener (10) further comprises an oversizing structure (20), said oversizing structure (20) being firmly bonded to at least a part of the shank portion (11) and/or the head portion (13) in order to oversize at least the part of the shank portion (11) and/or the head portion (13) such as to allow the fastener (10) to be installed in aligned holes (60a, 60b) having a diameter larger than that required for the fastener (10) without the oversizing structure (20).

14 Claims, 1 Drawing Sheet

(56) References Cited

U.S. PATENT DOCUMENTS

| | | | | |
|---|---|---|---|---|
| 3,407,903 A * | 10/1968 | Sansabrino | ............ | F16B 33/00 184/14 |
| 3,494,243 A | 2/1970 | Kleinhenn | | |
| 3,831,213 A * | 8/1974 | Bedi | ............ | C23C 4/02 470/11 |
| 3,983,304 A * | 9/1976 | Sekhon | ............ | C09D 161/06 411/504 |
| 9,057,397 B2 * | 6/2015 | Meyer | ............ | B05D 5/083 |
| 2003/0219328 A1 | 11/2003 | Schultz | | |
| 2004/0163740 A1 * | 8/2004 | Keener | ............ | B05D 3/0254 148/537 |
| 2004/0247835 A1 * | 12/2004 | Keener | ............ | C22F 1/10 428/160 |
| 2006/0046080 A1 | 3/2006 | Keener et al. | | |
| 2006/0099432 A1 | 5/2006 | Keener | | |
| 2008/0075555 A1 * | 3/2008 | March | ............ | F16B 35/048 411/361 |
| 2010/0124472 A1 * | 5/2010 | Nguyen | ............ | H01R 43/26 411/337 |
| 2013/0183119 A1 * | 7/2013 | Grobecker | ............ | F16B 43/002 411/337 |
| 2014/0169911 A1 * | 6/2014 | Sugimoto | ............ | C23C 4/131 411/366.1 |
| 2015/0147136 A1 * | 5/2015 | Maurel | ............ | F16B 33/06 411/378 |
| 2015/0251212 A1 * | 9/2015 | Ikeda | ............ | B05C 13/02 427/427.1 |
| 2015/0291225 A1 * | 10/2015 | Yao | ............ | F16B 1/00 296/203.01 |
| 2015/0337885 A1 * | 11/2015 | Whitlock | ............ | F16B 35/048 411/411 |
| 2016/0076575 A1 | 3/2016 | Kamal et al. | | |
| 2016/0076581 A1 * | 3/2016 | Liebscher | ............ | F16B 43/001 411/371.2 |
| 2016/0083109 A1 * | 3/2016 | Regnard | ............ | F16B 33/006 244/1 A |
| 2016/0222222 A1 * | 8/2016 | Stupar | ............ | F16B 33/06 |
| 2016/0281760 A1 * | 9/2016 | Kamal | ............ | F16B 33/06 |
| 2017/0298970 A1 * | 10/2017 | Bourges | ............ | F16B 4/004 |

* cited by examiner

FASTENER FOR ATTACHING TOGETHER WORKPIECES HAVING ALIGNED HOLES THERETHROUGH

This invention relates generally to a fastener, in particular high strength fastener, for attaching together workpieces having aligned holes therethrough, and more particularly to a fastener the fastener comprising a shank portion and a head portion provided at one end of the shank portion. The fastener further comprises an oversizing structure firmly bonded to at least a part of the shank portion and/or head portion. The oversizing structure has an outside diameter to increase the effective diameter of the shank portion of the fastener and to be in bearing contact with the workpieces when the fastener is in position through aligned holes in the workpieces.

The invention is primarily aimed at, though not necessarily limited to, aerospace structures. In such structures shear loading of fasteners is especially prevalent and precise fasteners in close tolerance holes most often used. This invention is meant to solve problems relating to fastener installation especially in aerospace structures.

In general, complex man-made structures, whether stationary such as buildings and bridges, or mobile such as moving vehicles operating on land, sea, air, or space, are normally made from many components attached together forming a complex structure. The design of attachment points, commonly known as joints, requires special knowledge and skill for engineering design and analysis. A major part of this task is the selection of proper components, such as fasteners, for joining and fastening the structure together.

The main purpose and primary objective in joint design is to facilitate the load transfer from one component of the structure to another component. The joined structure should be able to sustain the external and internal loads that may be experienced during its intended function. Loading may be in sustained static form or in a variable dynamic form. The functioning environment may be corrosive in nature affecting material properties and integrity of the fasteners and structural material. The operating environment may also undergo temperature changes affecting the load carrying characteristics of the joint and fasteners. All these factors should be considered in joint design and fastener selection.

Since man's original venture into building structures and moving vehicles, many types of fasteners have been conceived, developed, and used successfully. However, with an ever advancing civilization the need for continuous improvement is always evident. One common feature in most joint designs is to create holes, or apertures, in the joint components, typically referred to as workpieces, to insert and attach the components to each other by placing a suitable fastener in the matching holes. These fasteners, referred to by many different names and terms, are major contributors for constructing buildings, tools, vehicles, and other important structures comprising the present form of civilization and physical life.

Especially in the aerospace industry, various techniques have been used to ensure that threaded fasteners are secured with the requisite torque and that they stay secured during use. An example are blind fasteners which are commonly used to secure two or more workpieces together when it is otherwise impossible to access the underside (blind side) surface of one of the workpieces. Such fasteners have wide application in aircraft and space vehicle assembly. Due to the vibrations and sonic fatigue encountered in these environments, it is necessary to create a fastener of enduring strength and reliability.

Blind fasteners generally comprise a screw, a sleeve, a nut, and a drive nut. Generally, the screw has an externally threaded surface that allows the sleeve, the nut, and the drive nut, which are each internally threaded, to be placed onto the screw. The blind fastener is inserted into aligned apertures of the workpieces that are being secured together, and after installation is complete the sleeve and the nut will clamp the sheets together.

Generally high strength fasteners for attaching together workpieces having aligned holes therethrough in highly loaded structures come in standard graduated sizes.

The diameter of the aligned holes should be slightly larger than the diameter of at least the portion of the fastener that is intent to be installed in the aligned holes. If, however, the aligned holes are inadvertently and improperly prepared such that the difference between the diameter of the holes and the diameter of the fastener's portion is too large, a fastener having a standard graduated size cannot be installed in close tolerance anymore.

Moreover, it has been found in practice that when one of these standard fasteners has been inadvertently and improperly installed in workpieces of a critical, highly loaded structure, it is necessary to remove these fasteners therefrom and replace them.

Under present conditions, when the fasteners are to be replaced, the aligned holes through the workpieces must be redrilled to the next larger standard size because of the damage resulting from improperly installed fasteners or from corrosion. This requires the use of a standard fastener which is appreciably larger than the fastener previously installed therein.

A special oversize fastener which falls between two standard size fasteners could be used to fasten the workpieces together. Since such oversize fasteners must be made in very small quantities, the cost of production, stocking, and distribution in the work areas where these fasteners are used becomes prohibitive when large numbers of fasteners are being utilized as in the aerospace industry.

Hence, an object of the invention is to provide a fastener that is easily made oversized on demand. Another object of the invention is to provide a corresponding method of manufacturing such an oversized fastener.

With regard to the fastener, the object underlying the present invention is solved by the subject-matter of independent claim 1. Further developments of the inventive fastener and the inventive methods are provided in the respective sub-claims.

Accordingly, the invention relates particularly to a fastener, in particular high strength fastener, for attaching together workpieces having aligned holes therethrough. The fastener comprises a shank portion and an oversizing structure, said oversizing structure being firmly bonded to at least a part of the shank portion.

The shank portion of the fastener may have a predefined basic diameter. According to some aspects of the present disclosure, however, the shank portion of the fastener has no constant diameter, as it is the case, for example, with a tapered shank portion.

Preferably, the oversizing structure is made of rigid, relatively hard and strong material which is adapted to transmit bearing loads from the shank portion of the fastener to the workpieces.

It is also preferred that the diameter of the oversizing structure be close tolerance in the order of ±0.006 μm (=±0.00025 inch) in outside diametral tolerance.

Another feature which is essential is that the oversizing structure not require a hole of a size which will significantly reduce the edge distance relationship of the fastener with the sheet edge. Hence, with oversizing of e.g. 1/64 inch on basic fastener diameter a repair can be effected without jeopardizing structural integrity. Another consideration is that the material between holes is not significantly reduced. These considerations are all essential to successful fastening of highly loaded structures.

According to some embodiments of the present invention, the oversizing structure of the fastener comprises a sleeve-shaped structure provided at least around the shank portion of the fastener. Preferably, the oversizing structure is provided at least around the shank portion of the fastener that preferably extends through the workpieces.

The oversizing structure is firmly bonded to the outer surface of the shank portion of the fastener and has a thickness which is selected such as to oversize the shank portion and/or the head portion of the fastener to a certain (predefined) degree. The degree of oversizing, i.e., the thickness of the oversizing structure, may be selected depending from the redrilled diameter of the aligned holes of the workpieces such as to allow the fastener to be in bearing contact with the workpieces so that the load carrying capabilities of the joint, especially in shear, is not reduced.

Preferably (but not limited to), the oversizing structure is made out of a material which is identical to the material from which at least the shank portion of the fastener is made.

According to one aspect of the present invention, the oversizing structure consists of material coated, sprayed or otherwise applied to the outer surface of the shank portion. In particular, the material of the oversizing structure is applied to at least some areas of the outer surface of the shank portion such that the structural integrity of the shank portion is jeopardized as less as possible. For this purpose, the material of the oversizing structure may be applied to the outer surface of the shank portion, for example, by means of a brazing process, a coating deposition method, a cold gas dynamic spray process, a flame spray process, an arc spray process, a plasma spray process, a HVOF spray process, a detonation spray process, a high-power impulse magnetron sputtering process, a chemical vapor deposition process, a gas phase coating process, and/or a pack cementation process.

In some embodiments disclosed herein, the shank portion of the fastener is subjected to a physical or chemical separation process prior to applying the material of the oversizing structure to at least some areas of the outer surface of the shank portion, in order to remove a surface layer, for example a coating (if present) from the shank portion.

After the material of the oversizing structure has been applied to at least some areas of the outer surface of the shank portion, the fastener with the applied oversizing structure may be reworked to the exact fitting final contour. For example, a grinding, polishing and/or sanding process may be applied to the fastener with the applied oversizing structure. In addition thereto or alternatively, the fastener may be shrunk subsequently in a sintering process. Also, the fastener together with the oversizing structure may be re-coated, if necessary or desired.

All these deposition methods or processes are characterized in that the structural integrity of the shank portion of the fastener is if any only minimally jeopardized during formation of the oversizing structure. Accordingly, when bonding the oversizing structure to a shank portion of a certified fastener, i.e. a fastener that fulfills specific fastener standards, for example, ASTM's fastener standards, the oversized fastener still meets the fastener standards and a newly specifying, testing, and evaluating the material, dimensional, mechanical, and metallurgical properties of the oversized fastener becomes moot.

Other objects, features and advantages of the invention will be apparent from the following detailed description taken in connection with the accompanying drawings, in which.

Figure 1:
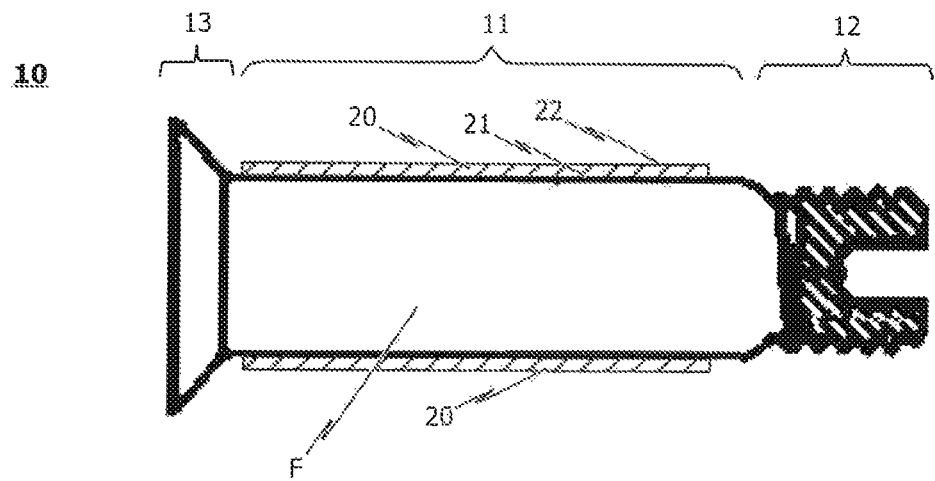
FIG. 1 is a side view of an exemplary embodiment of the inventive fastener.

A fastener 10 for securing together a plurality of workpieces and adapted to be located in aligned holes 60a, 60b in such workpieces 50a, 50b is disclosed. In exemplary embodiments, the fastener 10 may include a pin or bolt member defining a shank portion 11.

Although not illustrated in the drawings, the fastener 10 may further include a nut. In other embodiments, the fastener 10 may include a collar, in particular a swaged collar, instead of a nut. Moreover, the fastener 10 may also comprise a sleeve member (also not illustrated in the drawings).

In exemplary embodiments, the workpieces 50a, 50b can be formed with a plurality of materials, the materials including composite, metallic, or composite/metallic structures, or any combination thereof. In particular embodiments, the workpieces 50a, 50b may be constructed from titanium, aluminum, graphite composites, or any combination thereof.

Referring specifically to FIG. 1, the exemplary embodiment of the present invention is constituted by a conventional standard fastener F, here shown as a pin with head portion 13, shank portion 11 and threaded end portion 12 to fasten workpieces 50a, 50b together. The workpieces 50a, 50b have aligned holes 60a, 60b therethrough with a predetermined diameter. The holes 60a, 60b are slightly oversize from these normally made for the shank portion 11 of standard fastener F.

For example, the oversize of the holes 60a, 60b may be one-half of a standard size difference. For smaller diameter fasteners, the standard size difference may be, for example, in 1/32 inch increment and for larger diameter fasteners, the standard size difference may be, for example, in 1/16 inch increments. In other embodiments, the standard size difference may be, for example, in 0.5 mm increment. However, these values are clearly not limiting and other values can be selected.

According to another example, the shank portion 11 of the standard fastener F may have a diameter of approximately 9.52 mm, whereas the workpieces 50a, 50b have aligned holes 60a, 60b there through with a diameter of approximately 9.90 mm.

In yet other examples, the shank portion 11 of the standard fastener F may have a diameter of approximately 15.850 mm, 19.050 mm, 22.220 mm or 25.375 mm, whereas the workpieces 50a, 50b have aligned holes 60a, 60b there through with a diameter of approximately 0.396 mm larger than the respective diameter of the shank portion 11 of the standard fastener F.

While the standard fastener F shown in FIG. 1 is of the exposed head type with a constant diameter shank, it is to be understood that other type fasteners may be used.

Irrespective of the type and/or size of the conventional standard fastener F utilized in the present invention, the standard fastener F is provided with an oversizing structure 20 firmly bonded to at least a part of the shank portion 11 and/or head portion 13 of the conventional standard fastener F and preferably firmly bonded to at least the complete shank portion 11 of the conventional standard fastener F. The oversizing structure 20 disclosed herein serves to enlarge the effective diameter of the shank portion 11 of the standard fastener F to make an oversize fastener joint.

In some embodiments disclosed herein, the shank portion 11 of the standard fastener F is subjected to a physical or chemical separation process prior to applying the material of the oversizing structure 20 to at least some areas of the outer surface of the (machined) shank portion 11. In this regard, any coatings, outer surface layers or other deposits may be removed from the shank portion 11 prior to applying the oversizing structure 20.

After the material of the oversizing structure 22 has been applied to at least some areas of the outer surface of the shank portion 11, the fastener with the applied oversizing structure 22 may be reworked to the exact fitting final contour. For example, a grinding, polishing and/or sanding process may be applied to the fastener with the applied oversizing structure. In addition thereto or alternatively, the fastener may be shrunk subsequently in a sintering process. Also, the fastener together with the oversizing structure 22 may be re-coated, if necessary or desired.

In particular, the oversizing structure 20 consists of material coated, sprayed or otherwise applied to the outer surface of the shank portion 11. In other words, the material of the oversizing structure 20 is particularly applied to at least some areas of the outer surface of the shank portion 11 of the standard fastener F by means of a coating deposition method without jeopardizing structural integrity of the shank portion 11 or at least with only a minimal effect on the structural integrity of the shank portion 11.

For this purpose, the material of the oversizing structure 20 may be applied to the outer surface of the shank portion 11 and/or head portion 13, for example, by means of a brazing process, a coating deposition method, a cold gas dynamic spray process, a flame spray process, an arc spray process, a plasma spray process, a HVOF spray process, a detonation spray process, a high-power impulse magnetron sputtering process, a chemical vapor deposition process, a gas phase coating process, and/or a pack cementation process.

Preferably, the material of the oversizing structure 20 is selected such as to be identical or at least chemically similar to the material of the shank portion 11 of the standard fastener F.

All these deposition methods or processes are characterized in that the structural integrity of the shank portion 11 of the standard fastener F is if any only minimally jeopardized during formation of the oversizing structure 20.

In addition, when the material of the oversizing structure 20 is chemically compatible with the workpieces 50a, 50b, corrosive chemical reactions between the fastener and the workpieces 50a, 50b are prevented.

Particularly in highly loaded structures such as those of the aerospace industry, the spacing between adjacent holes 60a, 60b through the workpieces 50a, 50b and the free edge distance is so critical that the use of the next standard larger size fastener F would exceed the safety margin allowed in the basic design. On the other hand, the smaller diameter of the oversizing structure 20 allows them to be used to enlarge the standard fastener F without exceeding this safety margin.

Figure 2:
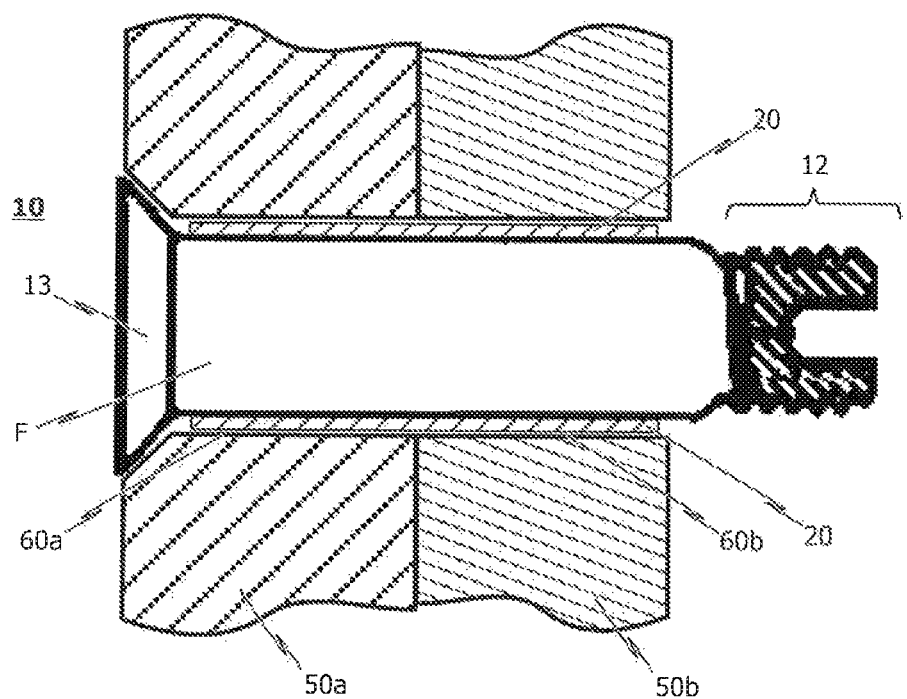
FIG. 2 is a longitudinal cross-sectional view of that embodiment of the invention shown in FIG. 1 as installed.

Referring more specifically to FIG. 1, the standard fastener F utilized in this embodiment is a constant diameter shanked fastener with an exposed head portion 13. The oversizing structure 20 bonded to the shank portion 11 of the fastener F is a sleeve-like structure designed to precisely fit in the holes 60a, 60b H through the workpieces 50a, 50b as seen in FIG. 2.

The invention, however, is not limited to fasteners F having a shank portion 11 of a predefined basic diameter. Rather, according to some aspects of the present disclosure, the shank portion 11 of the fastener F has no constant diameter, as it is the case, for example, with a tapered shank portion.

The sleeve-like oversizing structure 20 includes a tubular side wall having an inside surface 21 firmly bonded to at least some parts of the shank portion 11 of the standard fastener F. The outside surface 22 of side wall is of constant diameter and the side wall has a thickness of one-half the difference in diameters of shank portion 11 of the standard fastener F and the redrilled holes 60a, 60b in the workpieces 50a, 50b.

As stated hereinabove, preferably this thickness is nominally no greater than 0.008 inch (=0.2 mm) and is usually no more than 5 percent of the standard fastener diameter. In actual practice, the thickness may vary between 0.006 inch to 0.009 inch (=0.15 mm to 0.29 mm).

The length of the oversizing structure 20 is usually formed such as not to cover the threaded end portion 12.

Although not illustrated in the drawings, the oversizing structure 20 firmly bonded to the shank portion 11 of the standard fastener F may be provided with a plurality of grooves. For example, a plurality of circumferentially extending, axially spaced, V-shaped grooves may be provided around the side wall of the oversizing structure 20.

The oversizing structure 20 may be applied to the shank portion 11 of the conventional fastener F in an ungrooved manner, whereas the grooves may be later cut.

According to some embodiments disclosed herein, the grooves of the oversizing structure 20 may serve as reservoirs to trap and hold a coating of sealant or bonding agent when installed. This will prevent the flow of liquids or gasses through the fastener joint as well as bond the oversizing structure 20 to the workpieces 50a, 50b.

Because the grooves are located in the side wall of the oversizing structure 20, the mechanical properties such as strength and stiffness of the standard fastener F are maintained.

Making the oversizing structure 20 out of a material which is chemically compatible with the workpieces 50a, 50b will also prevent corrosive reactions with the workpieces 50a, 50b.

The standard fastener F having the oversizing structure 20 firmly bonded to at least a part of the shank portion 11 of the standard fastener is installed as shown in FIG. 2. In more detail, the assembly consisting of the standard fastener F and the oversizing structure 20 firmly bonded to the shank portion 11 of the standard fastener is inserted through the aligned (oversize) holes 60a, 60b in the workpieces 50a, 50b.

The oversize holes 60a, 60b may be made with standard, readily available drills and seamers since the inside and outside diametral tolerances of the oversizing structure 20 are maintained in the order of ±0.001 inch (=±0.025 mm).

Before a nut is threaded onto the pin portion of the inventive fastener 10 according to the exemplary embodiment illustrated in the drawings, a washer having a passage therethrough to receive the fastener 10 may be placed on that side of the workpieces 50a, 50b opposite head of the shank portion 11. Then the nut is installed and tightened to finalize the installation.

It will also be noted that a layer of sealant or bonding agent may be applied to the outside of the oversizing structure 20 before the fastener 10 is installed. Grooves provided in the outer surface of the oversizing structure 20 may serve to entrap the sealant and fully coat the inside of the holes 60a, 60b.

While an exposed head, constant diameter shanked pin has been illustrated with the oversizing structure 20, it is to be understood that any fastener with exposed head or flat head may be used therewith. Also, it is not mandatory that the shank portion of the fastener has a constant diameter.

From the foregoing, then, it will be seen that the method of invention serves to precisely enlarge by a limited, fixed close tolerance amount, the effective shank diameter of a standard fastener F, i.e. a fastener having a standard dimension, to permit the structural joining of workpieces 50a, 50b for highly loaded applications. This method comprises encircling that portion of the fastener in bearing contact with the workpieces 50a, 50b with an oversizing structure 20 of limited thickness; and inserting the fastener with the oversizing structure 20 therearound through the aligned holes 60a, 60b in the workpieces 50a, 50b and tightening the fastener in conventional manner.

In particular, the oversizing structure 20 is firmly bonded to a shank portion 11 of the standard fastener F. The material of the oversizing structure 20 is preferably chemically inert with respect to the workpieces 50a, 50b, such that there will be no chemical corrosive reaction between the oversizing structure 20 and workpieces 50a, 50b.

Although various thicknesses for the wall of the oversizing structure 20 may be used, in some embodiments it may be desirable to have these thicknesses substantially approximately 0.004 inch to approximately 0.008 inch (=approximately 0.1 mm to approximately 0.2 mm) which gives an overall increase in effective diameter to the fastener F of 1/128 to 1/64 inch (=0.2 mm to 0.4 mm).

In other embodiments disclosed herein, it may be desirable to have the thickness for the wall of the oversizing structure 20 substantially approximately 0.198 mm to approximately 0.397 mm which gives an overall increase in effective diameter to the fastener F of approximately 0.396 mm to 0.793 mm It is also understood that the oversizing structure 20 may be coated, for example, with an anticorrosive material to prevent corrosive chemical reactions between the various oversizing structure 20 and the workpieces 50a, 50b. Also, any other deposits and/or additional outer surface layers or coatings may be applied to the outer surface of the oversizing structure 20.

When the inventive fastener 10, i.e. a standard-size fastener F with the oversizing structure 20 firmly bonded to at least a part of the shank portion 11 of the fastener, is utilized in repair, the old fastener is removed from the aligned holes 60a, 60b in the workpieces 50a, 50b, and the aligned holes 60a, 60b enlarged by a specified amount, for example 1/128 inch or 1/64 inch (=0.2 mm to 0.4 mm).

The oversizing structure 20 is placed around at least a part of the shank portion 11 of the standard-size fastener and firmly bonded therewith. The wall thickness of the oversizing structure 20 is determined depending on the specified amount by which the aligned holes 60a, 60b are enlarged. The fastener F with the oversizing structure 20 firmly bonded thereto is then inserted through the enlarged holes 60a, 60b and tightened into place.

When a person installing a large number of the same size standard-fasteners F and damages only a few holes 60a, 60b in the workpieces 50a, 50b, only the damaged holes 60a, 60b must be made oversize.

The invention further relates to a method for manufacturing a fastener with an oversizing structure 20, in which a standard-fastener F having a shank portion 11 and a head portion 13 at one end of the shank portion 11 is provided, and in which the diameter of the shank portion 11 and/or the head portion of the standard-fastener F is at least partly increased by depositing additional material on the outer surface of the shank portion 11. In particular, the additional material is applied to the outer surface of the shank portion 11 and/or to the outer surface of the head portion 13 such that the additional material is firmly bonded to the shank portion 11 and/or the head portion 13 and the structural integrity of the fastener is not or only minimally jeopardized.

This can be accomplished, for example, by means of at least one of the following process: a brazing process, a cold gas dynamic spray process, a flame spray process, an arc spray process, a plasma spray process, a HVOF spray process, a detonation spray process, a high-power impulse magnetron sputtering process, a chemical vapor deposition process, a gas phase coating process, and/or a pack cementation process.

In summary, the present disclosure relates to the following aspects:

A fastener 10, in particular high strength fastener, for attaching together workpieces 50a, 50b having aligned holes therethrough, the fastener 10 comprising a shank portion 11 and a head portion 13 provided at one end of the shank portion 11, the diameter of the shank portion 11 and/or of the head portion 13 being selected such that the fastener 10 can be installed in the aligned holes in close tolerance, wherein the fastener 10 further comprises an oversizing structure 20, said oversizing structure 20 being firmly bonded to at least a part of the shank portion 11 and/or the head portion 13 in order to oversize at least the part of the shank portion 11 and/or the head portion 13 such as to allow the fastener 10 to be installed in aligned holes 60a, 60b having a diameter larger than that required for the fastener 10 without the oversizing structure 20.

According to embodiments of the inventive fastener, the thickness of the oversizing structure 20 is selected such as to compensate for an increased diameter of the aligned holes, said increased diameter of the aligned holes being a result of redrilling or drilling out the aligned holes required for the fastener 10 without the oversizing structure 20.

According to embodiments of the inventive fastener, the oversizing structure 20 is made of a material which is chemically compatible with the material of the shank portion 11 and/or of the head portion 13; and/or the oversizing structure 20 is made of a material having a Brinell Hardness Number of at least 60 and yield strength in excess of 20.000 p.s.i (=1379 bar).

According to embodiments of the inventive fastener, the oversizing structure 20 is made of a material different from the material of the shank portion 11 and/or of the head portion 13.

According to embodiments of the inventive fastener, the oversizing structure 20 consists of material coated, sprayed or otherwise applied to the outer surface of the shank portion 11 and/or head portion 13.

According to embodiments of the inventive fastener, the material of the oversizing structure 20 is applied to at least some areas of the outer surface of the shank portion 11 and/or head portion 13 by means of a coating deposition method without jeopardizing structural integrity of the shank portion 11.

According to embodiments of the inventive fastener, the material of the oversizing structure 20 is applied to at least some areas of the outer surface of the shank portion 11 and/or head portion 13 by means of a brazing process, a cold gas dynamic spray process, a flame spray process, an arc spray process, a plasma spray process, a HVOF spray process, a detonation spray process, a high-power impulse magnetron sputtering process, a chemical vapor deposition process, a gas phase coating process, and/or a pack cementation process.

According to embodiments of the inventive fastener, the material of the oversizing structure 20 is applied to at least some areas of the outer surface of the shank portion 11 and/or head portion 13 after these areas of the outer surface of the shank portion 11 and/or head portion 13 have been subjected to a physical or chemical separation process for removing a previously existing surface layer from these areas.

According to embodiments of the inventive fastener, the oversizing structure 20 is a sleeved-shaped structure having an inner diameter corresponding to the basic diameter of the shank portion 11, and an outer diameter that is at least 0.1 mm larger than the basic diameter of the shank portion 11.

According to embodiments of the inventive fastener, the shank portion 11 has a basic diameter of 1/32 inch (=0.79 mm) or a multiple of 1/32 inch (=0.79 mm), in particular 1/16 inch (=1.59 mm); or the shank portion 11 has a basic diameter of approximately 0.5 mm or a multiple of 0.5 mm.

According to embodiments of the inventive fastener, the fastener 10 has a threaded portion 12 provided at an end of the shank portion 11 opposite the head portion 13.

According to embodiments of the inventive fastener, the fastener 10 comprises a pin member having the elongated shank portion which terminates at one end in the head portion 13 and includes a threaded portion 12 having a plurality of threads with lock grooves. According to embodiments of the inventive fastener, the oversizing structure 20 is not applied at the threaded portion 12. According to embodiments of the inventive fastener, the oversizing structure 20 is provided with a flared portion which fits adjacent to the head portion of the fastener 10 and which is firmly bonded to the head portion of the fastener 10.

According to embodiments of the inventive fastener, the outer surface of the oversizing structure 20 is at least partly grooved.

The disclosure also relates to an repair assembly for replacing an original fastener installed in a hole of a workpiece 50a, 50b, said fastener repair assembly comprising a fastener 10 according to one of the previously disclosed embodiments, wherein a radial thickness of the oversizing structure 20 of the fastener 10 is selected such as to compensate for a hole having an increased diameter than that required for the original fastener, said increased diameter being a result of redrilling or drilling out the hole required for the original fastener.

The disclosure also relates to a method for manufacturing a fastener 10 with an oversizing structure 20, in particular a fastener according to one of the previously disclosed embodiments, the method comprising the steps of: providing a standard fastener F having a shank portion 11 and a head portion 13 at one end of the shank portion 11; at least partly increasing the diameter of the shank portion 11 by depositing additional material at least on the outer surface of the shank portion 11 such as to form an oversizing structure 20; and optionally supplementary processing at least the oversizing structure 20, wherein the additional material is applied to the outer surface of the shank portion 11 such that the additional material is firmly bonded to the shank portion 11 and the structural integrity of the shank portion 11 is not jeopardized.

The expression "standard fastener" as used herein generally refers to a fastener, in particular high strength fastener for attaching together workpieces having aligned holes therethrough, wherein this standard fastener has a standard size, particularly a standard sized shank portion and/or head portion. This standard fastener has either a nominal size of a basic shank or bolt diameter of n×1/64 inch (=n×0.396875 mm), with n being 1 or an integer multiple of 1, or according to the ISO metric system a nominal size of a basic shank or bolt diameter of 1.0 mm+n×0.5 mm, with n being 1 or an integer multiple of 1.

Standard fasteners are described, for example, in US 2006/0046080 A1, us 2016/0076575 A1, US 2003/0219328 A1, and U.S. Pat. No. 3,494,243.

According to embodiments of the inventive method, the additional material is optionally also applied to the head portion 13, and wherein the additional material is applied to the shank portion 11 and/or head portion 13 by means of at least one of the following process: a brazing process, a cold gas dynamic spray process, a flame spray process, an arc spray process, a plasma spray process, a HVOF spray process, a detonation spray process, a high-power impulse magnetron sputtering process, a chemical vapor deposition process, a gas phase coating process, and/or a pack cementation process.

The disclosure also relates to a method for replacing an original fastener installed in a hole of a workpiece 50a, 50b, said method comprising the steps of: removing the original fastener; machining the hole to a suitable dimension for installing a new fastener 10 with an oversizing structure 20, in particular a fastener according to one of the previously described embodiments; and installing the new fastener 10 with the oversizing structure 20 in the machined hole, wherein the oversizing structure 20 of the new fastener is selected such as to compensate for any increase of the diameter of the hole affected by the process of removing the original fastener. According to embodiments of the inventive method, the original fastener is removed by drilling out the original fastener.

While the above description contains many particulars, these should not be considered limitations on the scope of the disclosure, but rather a demonstration of embodiments thereof. The fastener and uses disclosed herein include any combination of the different species or embodiments disclosed.

The invention claimed is:

1. A fastener, in particular high strength fastener, for attaching together workpieces having aligned holes therethrough, the fastener comprising a shank portion with a diameter and an outer surface and a head portion with a diameter provided at one end of the shank portion, the diameter of the shank portion and/or of the head portion being selected such that the fastener can be installed in the aligned holes in close tolerance,
  wherein the fastener further comprises an oversizing structure with a thickness, said oversizing structure being firmly bonded to at least a part of the shank portion and/or the head portion in order to oversize at least the part of the shank portion and/or the head portion such as to allow the fastener to be installed in the aligned holes having a diameter larger than that required for the fastener without the oversizing structure,
  wherein the thickness of the oversizing structure is selected such as to compensate for an increased diameter of the aligned holes, said increased diameter of the aligned holes being a result of machining, redrilling or drilling out the aligned holes required for the fastener without the oversizing structure.

2. The fastener according to claim 1,
wherein the oversizing structure is made of a material which is chemically compatible with the material of the shank portion and/or of the head portion; and/or
wherein the oversizing structure is made of a material having a Brinell Hardness Number of at least 60 and yield strength in excess of 20.000 p.s.i (=1379 bar).

3. The fastener according to claim 2,
wherein the oversizing structure is made of a material different from the material of the shank portion and/or of the head portion.

4. The fastener according to claim 3,
wherein the oversizing structure consists of material coated, sprayed or otherwise applied to the outer surface of the shank portion and/or head portion.

5. The fastener according to claim 4, wherein the material of the oversizing structure is applied to at least some areas of the outer surface of the shank portion and/or head portion by means of a coating deposition method without jeopardizing structural integrity of the shank portion.

6. The fastener according to claim 5,
wherein the material of the oversizing structure is applied to at least some areas of the outer surface of the shank portion and/or head portion by means of a brazing process, a cold gas dynamic spray process, a flame spray process, an arc spray process, a plasma spray process, a HVOF spray process, a detonation spray process, a high-power impulse magnetron sputtering process, a chemical vapor deposition process, a gas phase coating process, and/or a pack cementation process.

7. The fastener according to claim 6,
wherein the material of the oversizing structure is applied to at least some areas of the outer surface of the shank portion and/or head portion after these areas of the outer surface of the shank portion and/or head portion have been subjected to a physical or chemical separation process for removing a previously existing surface layer from these areas.

8. The fastener according to claim 7,
wherein the oversizing structure is a sleeved-shaped structure having an inner diameter corresponding to the diameter of the shank portion, and an outer diameter that is at least 0.1 mm larger than the diameter of the shank portion.

9. The fastener according to claim 8,
wherein the shank portion has a basic diameter of n×1/64 inch=n×0.396875 mm), with n being 1 or an integer multiple of 1.

10. The fastener according to claim 9,
wherein the shank portion has a basic diameter of 1/32 inch (=0.79 mm) or a multiple of 1/32 inch (=0.79 mm), in particular 1/16 inch (=1.59 mm); or
wherein the shank portion has a basic diameter of approximately 0.5 mm or a multiple of 0.5 mm.

11. The fastener according to claim 9,
wherein the fastener has a threaded portion provided at an end of the shank portion opposite the head portion; or
wherein the fastener comprises a pin member having the shank portion which terminates at one end in the head portion and includes a threaded portion having a plurality of threads with lock grooves.

12. The fastener according to claim 11,
wherein the oversizing structure is not applied at the threaded portion.

13. The fastener according to claim 12,
wherein the oversizing structure is provided with a flared portion which fits adjacent to the head portion of the fastener and which is firmly bonded to the head portion of the fastener.

14. The fastener according to claim 13,
wherein the outer surface of the oversizing structure is at least partly grooved.

\* \* \* \* \*

UNITED STATES PATENT AND TRADEMARK OFFICE
CERTIFICATE OF CORRECTION

PATENT NO. : 11,408,454 B2
APPLICATION NO. : 16/609908
DATED : August 9, 2022
INVENTOR(S) : Jürgen Rösing et al.

It is certified that error appears in the above-identified patent and that said Letters Patent is hereby corrected as shown below:

In the Specification

1. In Column 3, Line 62, delete "is if any" and insert -- is - if any - --, therefor.

2. In Column 5, Line 47, delete "is if any" and insert -- is - if any - --, therefor.

3. In Column 7, Line 39, delete "mm" and insert -- mm. --, therefor.

Signed and Sealed this
Tenth Day of January, 2023

Katherine Kelly Vidal
*Director of the United States Patent and Trademark Office*